United States Patent [19]

Billington

[11] Patent Number: 5,489,767
[45] Date of Patent: Feb. 6, 1996

[54] MEDIA LABELING SYSTEM FOR DATA STORAGE ELEMENTS HAVING A COMMON FORM FACTOR

[75] Inventor: Robert L. Billington, Boulder, Colo.

[73] Assignee: Storage Technology Corporation, Louisville, Colo.

[21] Appl. No.: 195,706

[22] Filed: Feb. 14, 1994

[51] Int. Cl.⁶ ................................................. G06K 19/00
[52] U.S. Cl. ........................................... 235/437; 235/494
[58] Field of Search .................................. 235/437, 494; 369/34

[56] References Cited

U.S. PATENT DOCUMENTS

| | | | |
|---|---|---|---|
| 4,844,509 | 7/1989 | Kasprzak et al. | 235/462 |
| 4,889,982 | 12/1989 | Young et al. | 235/494 |
| 5,083,816 | 1/1992 | Folga et al. | 235/462 |
| 5,253,246 | 10/1993 | Leonhardt et al. | 360/132 |
| 5,303,214 | 4/1994 | Kulakowski et al. | 369/34 |
| 5,412,194 | 5/1995 | Melbye et al. | 235/437 |

FOREIGN PATENT DOCUMENTS

| | | | |
|---|---|---|---|
| 3314783 | 10/1984 | Germany | 235/462 |
| 88698 | 4/1989 | Japan | 235/437 |
| 3692 | 10/1983 | WIPO | 235/435 |

OTHER PUBLICATIONS

Section 4.6 code 39 pp. 31–35.

Primary Examiner—John Shepperd
Attorney, Agent, or Firm—Duft, Graziano & Forest

[57] ABSTRACT

The media labeling system makes use of human-readable and machine-readable label indicia to automatically identify of the media type contained within each of a plurality of data storage elements that have a substantially uniform external form factor. The machine-readable indicia includes a standard 3-of-9 bar code in addition to a unique bar and space code to provide error detection for damaged or partially obliterated labels, and to help low resolution bar code interpreters to distinguish the media type label from other label indicia present on the data storage element.

11 Claims, 4 Drawing Sheets

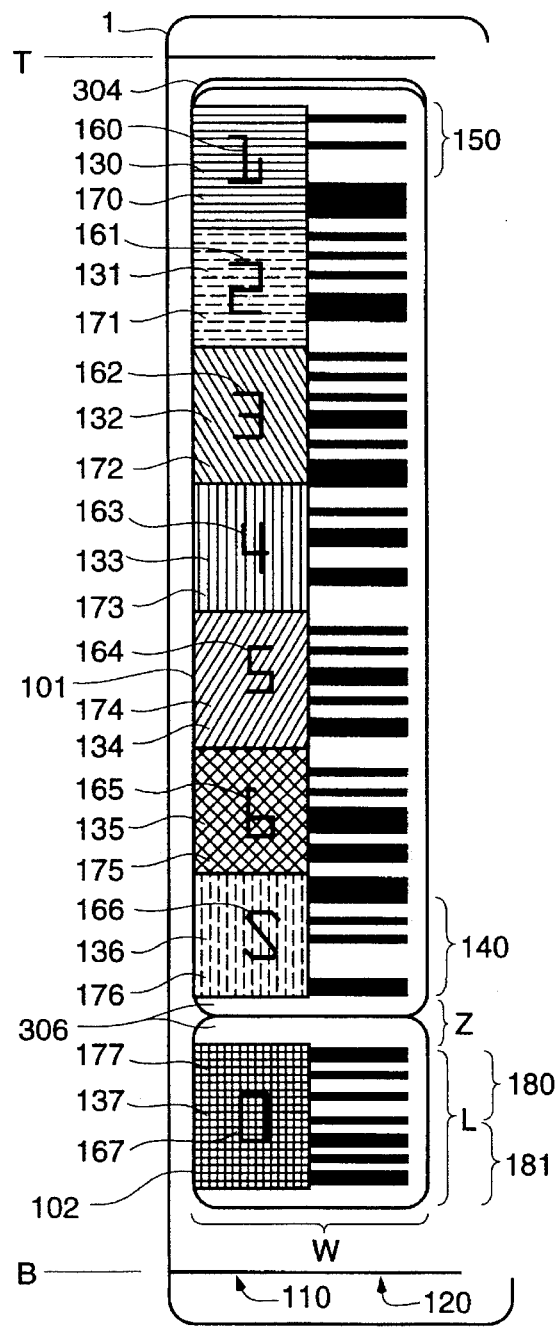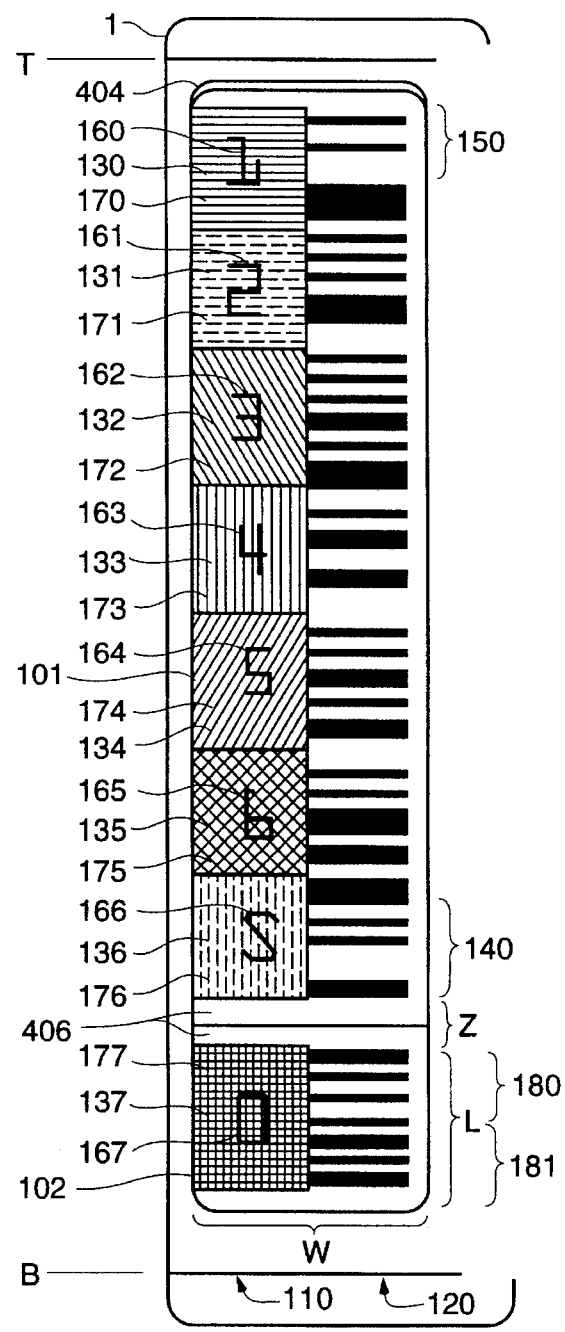
FIG. 3  FIG. 4

MEDIA LABELING SYSTEM FOR DATA STORAGE ELEMENTS HAVING A COMMON FORM FACTOR

CROSS-REFERENCE TO RELATED APPLICATIONS

This application is related Ser. No. 07/857,166 filed Mar. 25, 1992 now U.S. Pat. 5,412,194.

FIELD OF THE INVENTION

This invention relates to labeling systems, and in particular to a label which contains indicia that facilitates automated identification of the media type within each of a plurality of data storage elements having a substantially uniform external form factor, in addition to containing an error detection code indicia that helps to determine whether a media label is damaged and to distinguish the media label's indicia from indicia on other labels.

PROBLEM

Bar codes, Optical Character Recognition (OCR) characters, and color codes are common indicia found on labels used by present day labeling systems. Bar codes, OCR characters, and color codes are machine-readable by electronic interpreters, and OCR characters and color codes are also easily human-readable. These indicia can be printed on labels in order to uniquely identify items to which the labels are attached.

One example of using bar code and OCR labeling technology is to identify 3480-type magnetic tape cartridges commonly used in the data processing industry. The 3480-type magnetic tape cartridges are an industry standard for reading and writing data for two reasons: 1) the magnetic tape is a reliable and durable media type; and 2) the cartridge housing itself has a substantially uniform external form factor capable of housing many different media types besides the traditional longitudinal tape, including but not limited to disk, solid state memory, helical tape, and other magnetic tapes of varying lengths, thicknesses and data recording characteristics. For this latter reason, the 3480-type magnetic tape cartridge is more generically called a data storage element rather than a magnetic tape cartridge.

In some data processing facilities, each data storage element contains the same media type and a human operator manually retrieves and loads a particular data storage element into a media drive when requested by a data storage system user. In other facilities, many data storage elements are stored in automated libraries such as the 4400 Automated Cartridge System (ACS) library manufactured by Storage Technology Corporation of Louisville, Colo. An ACS uses a centrally located robotic data storage element handling mechanism to automatically retrieve and load a user requested data storage element from a surrounding cylindrical library stack into a media drive. In either facility, a label applied to each data storage element identifies an individual data storage element by its unique VOLame SERial number (VOLSER). To accommodate both human operators and automated libraries, the typical labeling system includes a redundant combination of bar code, OCR character, and/or color code indicia on each label. In automated libraries, only the bar code is typically read. The OCR and color code indicia exist so that a human operator can identify the data storage element in the event it is removed from the automated library.

One problem with existing labeling systems is that each label contains only a VOLSER to distinguish one data storage element from the next. Such a labeling system does not identify the media type contained within a data storage element. Therefore, an automated library or human operator must either assume that only one media type exists within all data storage elements, or maintain a separate data base identifying the media type associated with each VOLSER. Further, relying on users to specify a particular type media drive in advance of retrieving and loading the data storage element in the media drive means that the media type is no longer transparent to the user.

A second problem with existing labeling systems is that because the VOLSER does not identify the media type contained within a data storage element, and because different media types are often only compatible with corresponding media drives, either the media type, the media drive, or both can be damaged if a particular media type is inadvertently mounted in an incompatible media drive. Damaging either A third problem with existing labeling systems is that they lack the ability to identify damaged or unreliably altered labels. Therefore, a damaged or altered label may be misread by the bar code interpreting device thereby resulting in data loss by inadvertently overwriting data already on the media or by causing component damage as previously discussed.

Another problem with existing labeling systems is that the lines and spaces of standard 3-of-9 bar codes found on existing VOLSER labels can be too fine to be reliably read by low resolution bar code interpreters. Therefore, merely integrating media type identification into the existing VOLSER label's bar code indicia is not a solution compatible with low resolution bar code interpreters since the VOLSER label is already at the resolution limit without media type identification. Further, implementing a binary bar code indicia containing error detection or more elaborate error correction codes, creates closely packed bars and spaces that are indistinguishable by low resolution bar code interpreters. Finally, there is insufficient space to add a VOLSER style media type label to the data storage element's already limited edgewise labeling surface area. This is because there is only room for a single OCR character and bar code equivalent, and no room for the VOLSER style start and stop characters that mark the beginning and end of significant label characters. For these reasons, automated library system owners with low resolution interpreters are forced into purchasing expensive high resolution optical equipment upgrades, in addition to the new media type's expense, if they wish to benefit from alternative media types in their existing automated libraries.

SOLUTION

The above described problems are solved and a technical advance achieved in the field by the media labeling system of the present invention. A preferred embodiment of this labeling system is located on the edgewise surface of a data storage element similar to the 3480-type magnetic tape cartridge form factor. Although the media labeling system of the present invention can be implemented on a substrate with primed indicia on one surface and an adhesive on the opposing surface, labeling can also be implemented by physically and materially integrating the indicia with the data storage element's surface in ways that include but are not limited to, molding, color molding, etching, engraving, painting, or stamping.

The present invention facilitates automated media type identification of the media contained within a data storage element. This is accomplished by way of a coded media type label containing an error detection bar code and a machine-readable 3-of-9 type bar code indicia that is interpretable independent of existing VOLSER identifying indicia. The media type label also accommodates redundant OCR character indicia and/or color coded indicia as commonly found on existing VOLSER labels. The redundant indicia is used to uniquely identify any one of a plurality of media types, so that an automated library or a human operator can identify a compatible media drive, thereby avoiding physical damage to either or both components, or inadvertently overwriting data already on the media. In the typical automated library with a low resolution bar code interpreter, only the bar code indicia is read.

Each media type label also contains an error detection bar code that when read in combination with the 3-of-9 type bar code indicia representing a specific media type, creates a unique key indicating whether or not the media type label is damaged. This provides a compact error detection capability heretofore not found with standard 3-of-9 bar coded labels.

Finally, the media type label's error detection bar code also serves to distinguish the media type label from the VOLSER label without using traditional VOLSER style start and stop characters. This results in a significant space savings on bar code and error correction code, so that the bar codes are readable by low resolution bar code interpreters and distinguishable from the VOLSER bar code.

Therefore, implementing the media labeling system of the present invention offers automated library owners a reliable means for automatically identifying alternative media types, in addition to a cost effective alternative to upgrading expensive robotic bar code interpreter devices.

BRIEF DESCRIPTION OF THE DRAWING

FIGS. 3–7 illustrate alternative embodiments of the media labeling system having an error detection code imprinted thereon.

DETAILED DESCRIPTION

To overcome deficiencies in present labeling systems, a label identifying the media type within the data storage element is attached to each data storage element that is stored in either a manual library or automated library. The media type label is affixed to the same data storage element surface as the VOLSER label and can be either a separate label from the VOLSER label or on a separate section of the same label surface containing the VOLSER indicia. In the preferred embodiment, a separate media type label is attached in a defined area to the data storage element by the data storage element manufacturer. The user/customer typically attaches the VOLSER label to the data storage element at the time the data storage element is placed in service. In either case, the media type label conforms to the VOLSER indicia format by including both human-readable and machine-readable indicia on each label, although the color coded indicia is optional. In addition, the media type label of the present invention contains a unique error detection code to determine if the label has been damaged or smudged, and to help distinguish the media type label from the VOLSER label.

Figure 1:
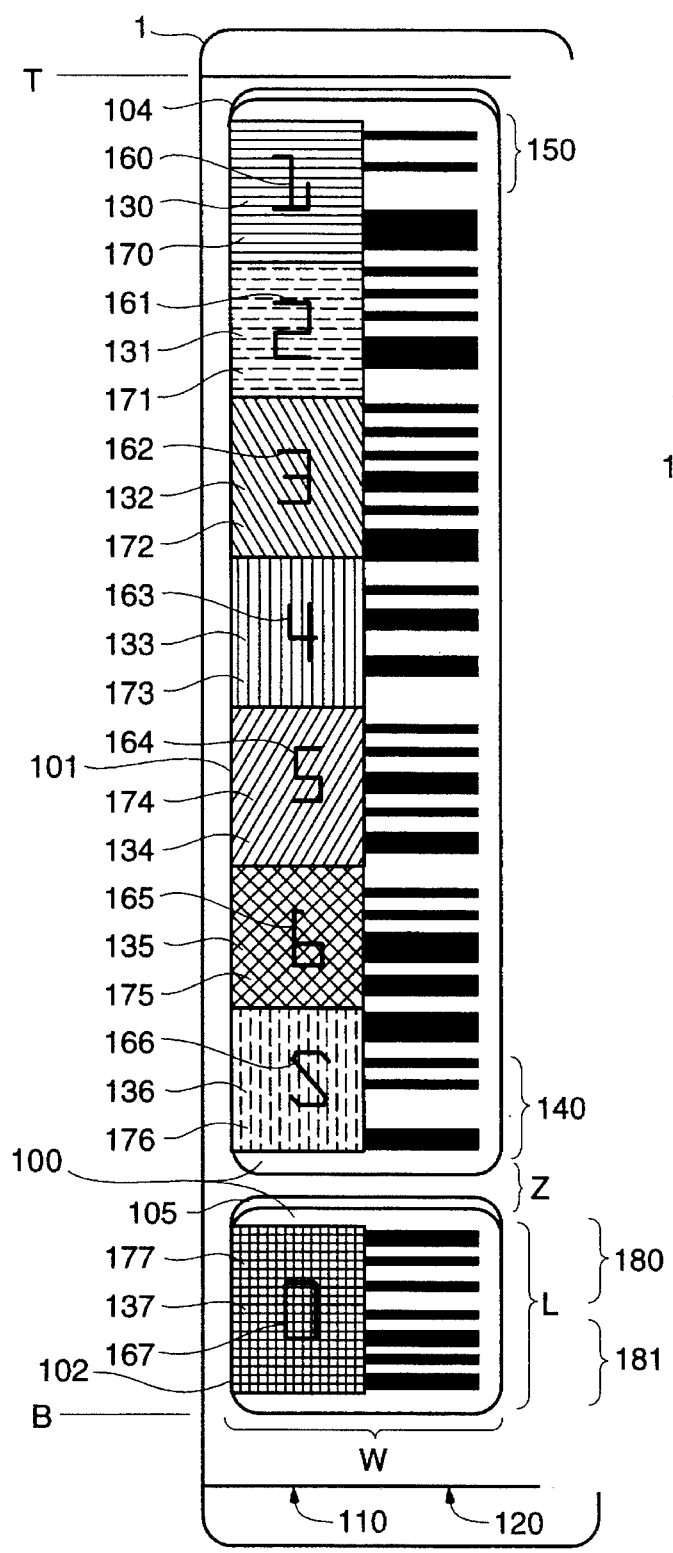
FIG. 1 illustrates an embodiment of a media labeling system having an error detection code imprinted thereon.

FIG. 1 illustrates the present invention's media type label 102 as it would be found on a data storage element 1 where the data storage element has a similar form factor to the 3480-type magnetic tape cartridge. Although the VOLSER label 101 is physically separate from the media type label 102 by distance z which is substantially ⅛ inch or less, both labels and the indicia on each label are considered substantially juxtaposed if the distance z is substantially ⅛ inch or less. Both labels 101 and 102 are contained in separate recessed label receiving areas 104 and 105, respectively, which are formed in the data storage element 1. Each label 101 and 102 has a print receiving surface 100 which is attached to an adhesively backed substrate that affixes each label to a surface of the data storage element 1. The media type label 102 and the VOLSER label 101 can be printed and affixed to data storage element 1 by either the manufacturer or the user, however, the media type label 102 is preferably affixed by the manufacturer.

Labels 101 and 102 both contain human-readable and machine-readable indicia top T to bottom B of the data storage element 1, and the machine-readable indicia is read from the bottom B to top T, the labeling system of the present invention is not directionally dependent. However, the error detection code is preferably oriented in the same direction that the bar code interpreter reads.

The media type label 102 also has a length L and width W such that the width W is substantially 60 percent of the length L. The width of the bar code indicia 181 in column 120 of media type label 102 is substantially 21 percent of length L.

Finally, to accommodate low resolution bar code interpreters, the nominal width of a narrow space or narrow bar in either bar code 180 or 181, is at or about 0.029 inches. The nominal width of a corresponding wide bar or space is at or about 0.058 inches.

Human-Readable Indicia

The first indicia column 110 on labels 101 and 102 is divided into a series of vertically aligned, rectangular segments 130–137. Each rectangular segment contains one human-readable character 160–167, where each character is substantially centrally located in spaces 130–137. When column 110 of label 101 is read by a human, the indicia characters represent a VOLSER. When column 110 of label 102 is read by a human, the single indicia character represents a media type.

Each rectangular segment 130–137 of column 110 may also contain a background color 170–177 that uniquely corresponds to the respective characters 160–167. The indicia colors represent the same human-readable VOLSER as the characters 160–166. In addition, the color in column 110 of label 102 represents the same human-readable media type as the character 167. Therefore, both the OCR character and color indicia in column 110 form the same VOLSER and media type identification that is useful to humans who must identify a data storage element that has been removed from the automated library system.

Machine-Readable Indicia

Column 120 of label 101 and 102 represents the same respective VOLSER and standard 3-of-9 bar code form. The bar code represents alphanumeric characters in the range A–Z and 0–9.

Unique to the bar code in column 120 of VOLSER label 101 are the start and stop characters 140 and 150 respectively which are used to indicate the beginning and end of the significant VOLSER characters 160–166. The start and stop characters 140 and 150 are by tradition, either a $, *, or the character P. Becaase the bar code representation of the VOLSER contains additional start and stop characters not also found in human-readable column 110, the bar code equivalent of the significant VOLSER characters 160– 166 are not necessarily directly opposite the corresponding human-readable indicia in spaces 130–136.

Column 120 of media label 102 contains a 3-of-9 type bar code indicia 181 representing a single character A–Z, 0–9, or any special character including $, *, or P, because start and stop characters are not used in a media label. An error detection code 180, seen also in detail in FIG. 2, distinguishes the column 120 bar code indicia of media label 102 from the start character 140 of the VOLSER label 101 Error detection code 180 is also used to determine if an error exists in the media type bar code 181 as discussed below. The distinction between a media type bar code 181 and a VOLSER bar code is made simultaneously with the error detection process as discussed below.

Error Detection Code

Figure 2:
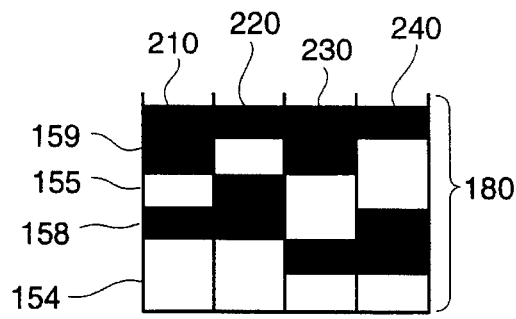
FIG. 2 illustrates an enlarged error detection code indicia matrix.

FIG. 2 illustrates an enlarged error detection code matrix showing the four error detection code configurations used in the error detection code 180. Specifically, the four configurations are illustrated in columns 210, 220, 230, and 240, and each configuration includes two bars 158 and 159, and two spaces 154 and 155. Therefore, 7 total bars appear on any one media type label's machine-readable bar code indicia: 5 bars for the 3-of-9 type bar code indicia 181, and 2 bars for the error detection code 180.

In addition to the error detection code 180 always having two bars and two spaces, only one of the bars 158 and 159, and only one of the spaces 154 and 155, are wide at any one time. Further, the first error detection indicia 154 is always a space and the last error code indicia 159 is always a bar. This creates the four distinct configurations 210, 220, 230, and 240 that are unique to error detection code 180. In the present FIG. 2 perspective where the error detection code is read from the bottom up, the bars and spaces create an incomplete or invalid 3-of-9 bar code sequence. Therefore, because the error detection code is an illegal 3-of-9 code, the error detection code further distinguishes the media type bar code 181 from the VOLSER label indicia.

The error detection code 180 and machine-readable media label indicia 181 combination, is generated by consulting a lookup table at the time each label or set of labels for a particular media type is printed. The lookup table matches one of the four error detection code configurations 210, 220, 230, or 240, with a corresponding one of the 3-of-9 bar code representation of the character A–Z, 0–9, or special character assigned to the particular media type. For example, the bar code representation of the alphabetic, numeric, or special character selected to represent any media type A, B, C, D, E . . . is assigned one of a repeating cycle of error detection code configurations 210, 220, 230, 240, and 210 of FIG. 2 respectively. In other words every fourth media type character, A and E in the present example, are assigned the same error detection code configuration 210. Other error detection code configuration assignment schemes can be used as desired. The unique combination of media type bar code 181 and error detection code 180 is printed on one side of a media label substrate and the substrate is subsequently attached to the data storage element by an adhesive. Alternatively, the combination of media type bar code 181 and error detection code 180 can be physically and materially integrated with the data storage element surface as previously discussed herein.

When a bar code Interpreter reads the bar code indicia 120 of media label 102, the media type bar code 181 is read as a complete 3-of-9 bar code that is independent from the 4 element bar code of error detection code 180. The bar code interpreter will first consult the lookup table to find a match for the media type bar code 181. If the lookup table does not contain a match for the media type bar code 181, then the media type bar code 181 most certainly contains an error or is otherwise damaged so as to prevent accurate reading. In this case, the data storage element bearing the media label 102 will not be loaded into any media drive. If the lookup table does contain a match for the media type bar code 181, then the lookup table is consulted further to determine if the error detection code 180, read from the media label 102, is the error detection code that is expected to accompany the media type bar code 181 in question. For instance, the media type bar code representation for A in the above example could only be considered a valid media type bar code if it is accompanied by the error detection code configuration 210. Therefore, if the error detection code 180 accompanying the media type bar code 181 in question does not match the lookup table entry, then an error is detected in the bar code indicia 120 of media label 102 and the data storage element bearing the media label 102 is not loaded into any media drive. Alternatively, if the error detection code 180 accompanying the media type bar code 181 in question does match the lookup table entry, then the media type bar code is considered valid and the data storage element bearing media label 102 is loaded into a corresponding media drive. It is Important to note that media type bar code 181 and error detection code 180 are independent bar codes.

Other Embodiments

FIG. 3 illustrates an embodiment of the present invention which is identical in all respects to the FIG. 1 embodiment except that there is no physical distance z separating the media type label 102 from the VOLSER label 101. Here, the data storage element 1 contains a single label receiving recessed area 304 sized to hold both the individual VOLSER label 101 and the individual media type label 102. Although the indicia on each label are separated by white space borders 306 on each label, the labels and the indicia on each label are considered substantially juxtaposed. The media type label 102 contains the same error detection code 180 as discussed in FIG. 2.

FIG. 4 illustrates an embodiment of the present invention which is identical in all respects to the FIG. 3 embodiment except that the indicia on media type label 102 and VOLSER label 101 both reside on a single substrate surface 100. Here the data storage element 1 contains a single label receiving recessed area 404 within each label are considered substantially juxtaposed. The media type indicia 102 contains the same error detection code 180 discussed in FIG. 2.

Figure 5:
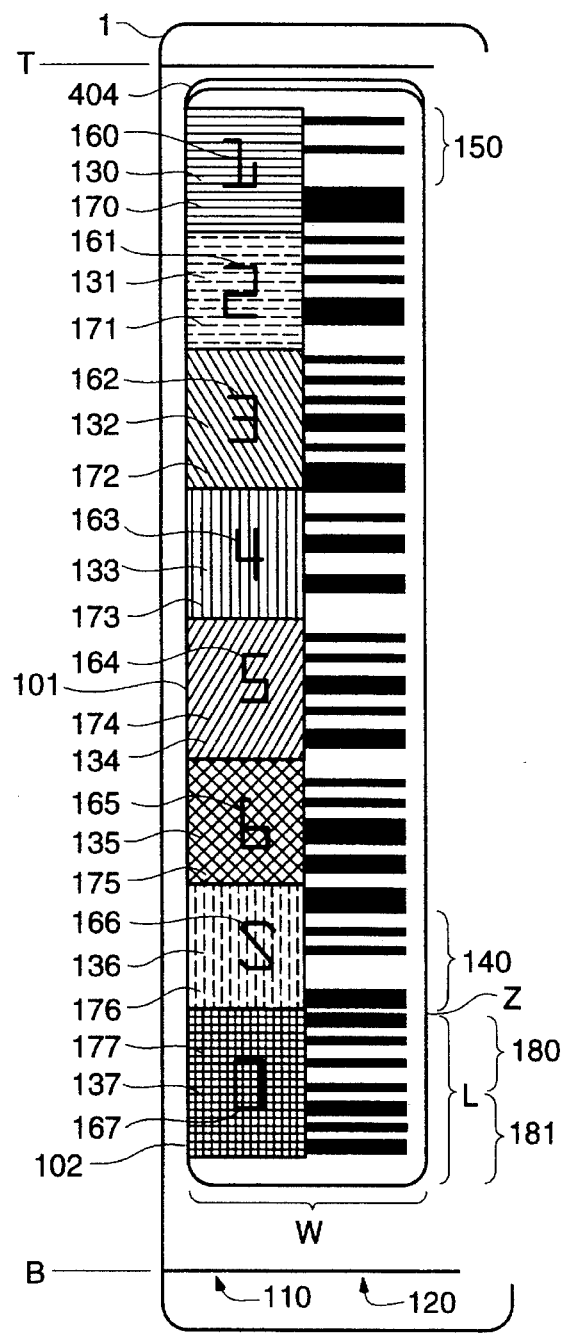

FIG. 5 illustrates an embodiment of the present invention which is identical in all respects to the FIG. 4 embodiment except that there is no white space at z, between the indicia on media type label 102 and VOLSER label 101, and both reside on the same substrate surface 100. The media type indicia 102 contains the same error detection code 180 as discussed in FIG. 2.

Figure 6:
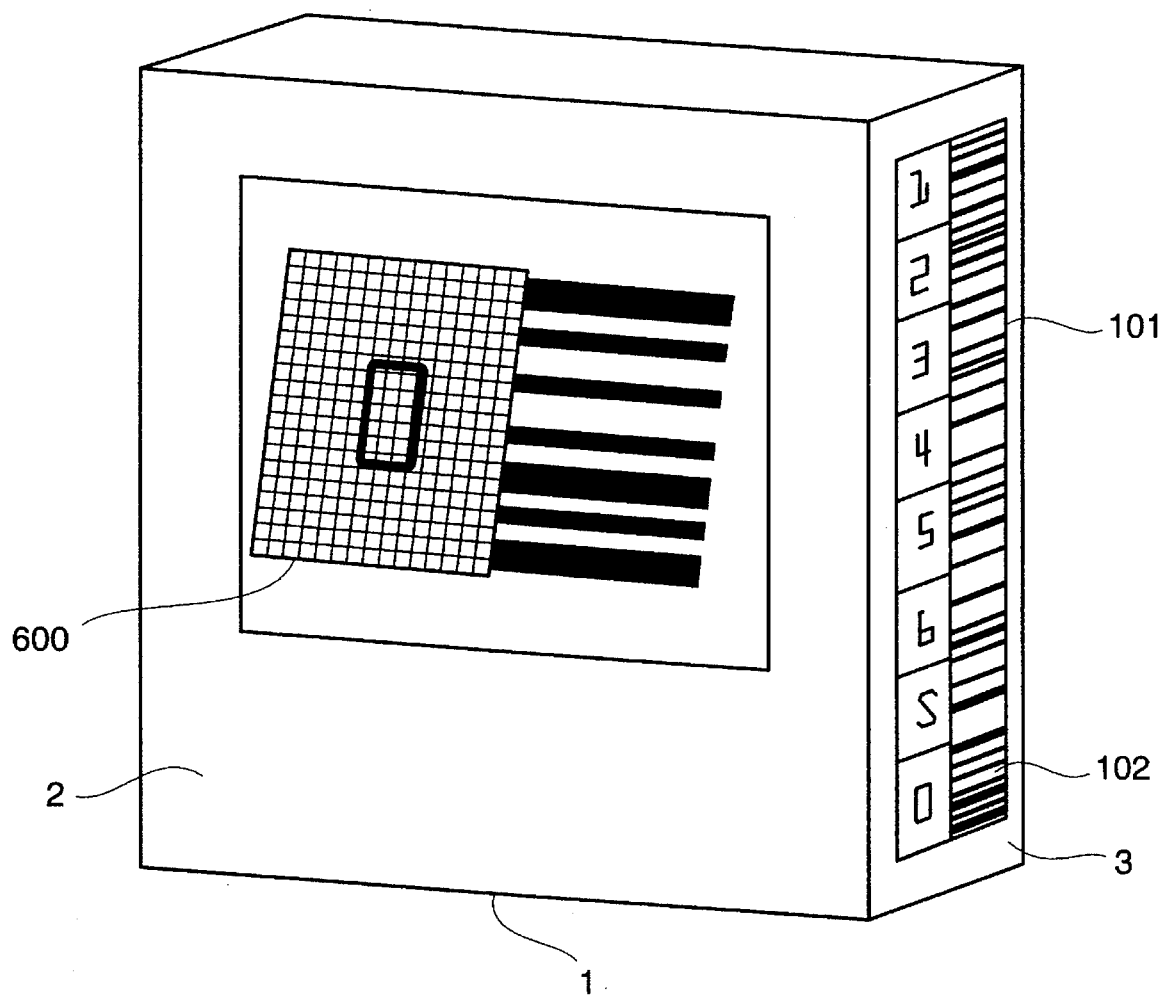

FIG. 6 illustrates an embodiment of the present invention where a redundant media label 600 is located on a surface 2 of the data storage element 1 that is not also occupied by the VOLSER label 101 and media type label 102 which reside on surface 3. Surface 3 of data storage element 1 can contain any embodiment previously illustrated herein. Alternatively, the media type label 102 need not exist at all on surface 3 of data storage element 1 since the redundant media label 600 on surface 2 alone could serve to identify the media type within the data storage element 1.

Figure 7:
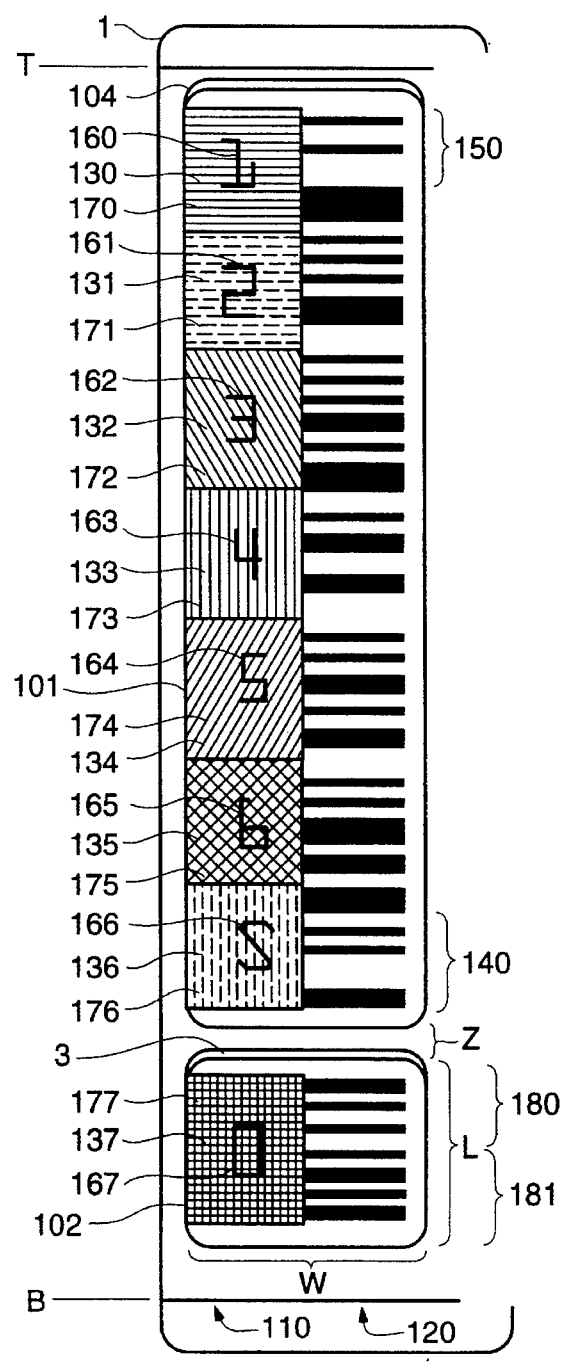

FIG. 7 illustrates an embodiment of the present invention where the media type label 102 is molded into surface 3 of data storage element 1. The indicia on media type label 102 is identical in function and content to the media type label 102 in all previously discussed embodiments. By molding the media type label 102 into the surface 3 of data storage element 1, the manufacturer eliminates the separate steps necessary when printing and affixing adhesive labels to the data storage element 1. To achieve color contrast in the bar codes 181 and 180, either the bars or spaces can be painted or molded with appropriate colors used in the molding process. Any similar coloring process can be used to color the human readable indicia 177 of column 110. The VOLSER label 101, however, can be made of the traditional printed substrate backed with adhesive to affix the label to the data storage element 1. The VOLSER label 101 is preferably affixed to the data storage element 1 in recess 104 by the user. In addition to physically and materially integrating the media type label 102 with data storage element 1 by molding or color molding, other types of integrating include, but are not limited to, etching, engraving, painting, or stamping. Finally, the molded media type label 102 of the present invention can appear alone or in combination with a VOLSER label 101 as illustrated in any of the alternative embodiments herein.

While specific embodiments of this invention have been disclosed, it is expected that those skilled in the art can and will design alternate embodiments of this invention that fall within the scope of the appended claims. Further, although the 3480-type form factor may be common in the industry and was used herein as an example, the media labeling system of the present invention is applicable to similar labeling systems on any size or type data storage element form factor.

I claim:

1. A media labeling system for uniquely identifying a media type contained within a data storage element, said media labeling system comprising:

a media label substrate having a first surface for containing two redundant sets of indicia in a first predefined field and a second predefined field, and a second surface for affixing said media label substrate to said data storage element;

a first set of indicia in human-readable form printed in said first predefined field for defining a media type identification for said media type contained within said data storage element;

a second set of indicia in machine-readable form printed in said second predefined field for defining said media type identification for said media type contained within said data storage element; and an error detection code indicia consisting of an incomplete character in machine-readable form printed in said second predefined field for detecting at least one error in said second set of indicia.

2. The media labeling system of claim 1 wherein:

said media label substrate and a unique data storage element identifier are substantially juxtaposed and attached to a common data storage element surface; and said error detection code indicia in said second predefined field distinguishes said media labeling system from said unique data storage element identifier.

3. The media labeling system of claim 2 wherein said media labeling system and said unique data storage element identifier reside on a common substrate.

4. The media labeling system of claim 1 wherein said error detection code indicia includes at least two bars and at least two spaces, and only one of said at least two bars is wide and only one of said at least two spaces is wide at one time, and said error detection code indicia begins with one of said at least two spaces and ends with one of said at least two bars.

5. The media labeling system of claim 1 wherein said first set of indicia are in at least one form selected from the group consisting of color code and alphanumeric.

6. The media labeling system of claim 1 wherein said media label substrate has a substrate length and a substrate width such that said substrate width is substantially 60 percent of said substrate length.

7. The media labeling system of claim 6 wherein said second set of indicia printed on said media label substrate has an indicia length and an indicia width such that said indicia width is substantially 21 percent of said indicia length, and said first set of indicia printed on said media label substrate occupies the substantial remaining printing surface of said media label substrate.

8. The media labeling system of claim 1 wherein said media label substrate resides on a data storage element surface not also occupied by said unique data storage element identifier.

9. The media labeling system of claim 1 wherein a redundant media label substrate for identifying said media type contained within said data storage element, resides on a data storage element surface not also occupied by said unique data storage element identifier and said media label substrate.

10. A media labeling system for uniquely identifying a media type contained within a data storage element, said media labeling system comprising:

a media identification area having two redundant sets of indicia in a first predefined field and a second predefined field, wherein said media identification area is materially and physically integrated with said data storage element;

a first set of indicia in human-readable form fixed in said first predefined field for defining a media type identification for said media type contained a second set of indicia in machine-readable form fixed in said second predefined field for defining said media type identification for said media type contained within said data storage element; and an error detection code indicia consisting of an incomplete character machine-readable form fixed in said second predefined field for detecting at least one error in said second set of indicia.

11. The media labeling system of claim 10 wherein said media identification area being materially and physically integrated with said data storage element is in at least one form selected from the group consisting of molded, color molded, etched, engraved, painted, and stamped.

\* \* \* \* \*